United States Patent [19]

Foxford

[11] Patent Number: 5,575,195
[45] Date of Patent: Nov. 19, 1996

[54] COLLAPSIBLE PORTABLE COOKING UNIT

[76] Inventor: Kenneth E. Foxford, 13344 - 36th Pl., Yuma, Ariz. 85367

[21] Appl. No.: 585,714

[22] Filed: Jan. 16, 1996

[51] Int. Cl.⁶ ............................. A47J 37/00; A47J 37/07
[52] U.S. Cl. .................. 99/340; 99/449; 99/450; 99/482; 126/9 R; 126/9 B; 126/25 R
[58] Field of Search ........................... 99/339, 340, 400, 99/401, 444–446, 447, 448, 450, 449; 126/25 R, 9 R, 9 B, 25 A, 41 R, 26, 29, 30, 38

[56] References Cited

U.S. PATENT DOCUMENTS

| | | | |
|---|---|---|---|
| 3,858,495 | 1/1975 | Gotwalt | 99/449 X |
| 4,158,992 | 6/1979 | Malafouris | 99/339 |
| 4,457,290 | 7/1984 | Edwards | 126/9 R |
| 4,481,408 | 11/1984 | Scheufler | 126/9 B |
| 4,508,096 | 4/1985 | Slattery | 126/9 R |
| 4,569,327 | 2/1986 | Velten | 126/25 R |
| 4,905,582 | 3/1990 | Lee | 99/450 |
| 4,922,887 | 5/1990 | Foxford | 126/41 R |
| 4,971,045 | 11/1990 | Probst | 126/9 R |
| 4,977,824 | 12/1990 | Shinler | 99/449 |
| 5,105,726 | 4/1992 | Lisker | 99/340 |
| 5,243,961 | 9/1993 | Harris | 126/9 R |
| 5,293,859 | 3/1994 | Lisker | 99/449 X |

*Primary Examiner*—Timothy F. Simone
*Attorney, Agent, or Firm*—Gregory J. Nelson

[57] ABSTRACT

A foldable outdoor cooking device having wall assemblies which are hinged and foldable and when erected form an enclosure. Hangers are detachably securable to the enclosure to support a cooking grill above the enclosure. The device may be used with gaseous fuels or may be positioned on a pan so wood or charcoal may be used as a fuel. The grill has handles which may be extended to assist the user in moving the grill.

10 Claims, 2 Drawing Sheets

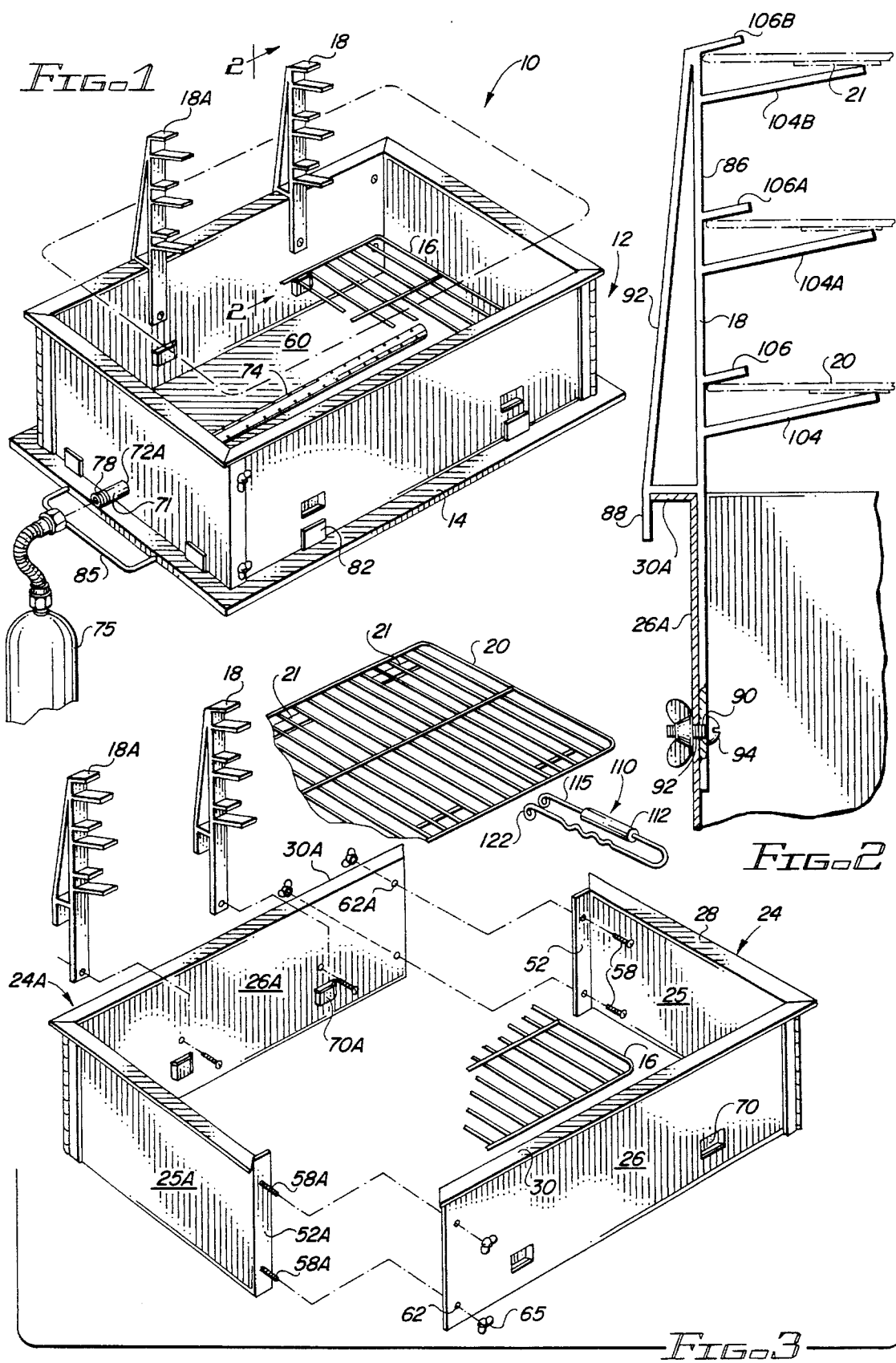

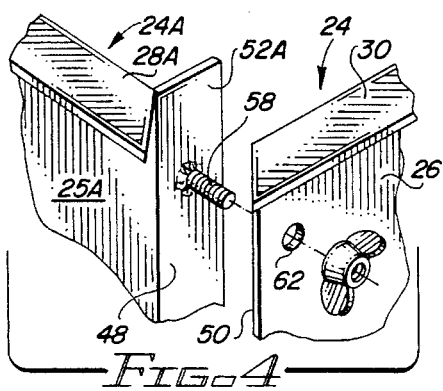
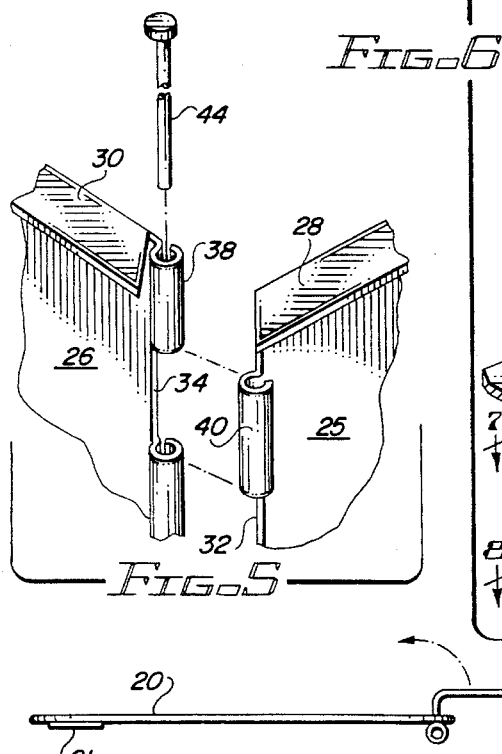
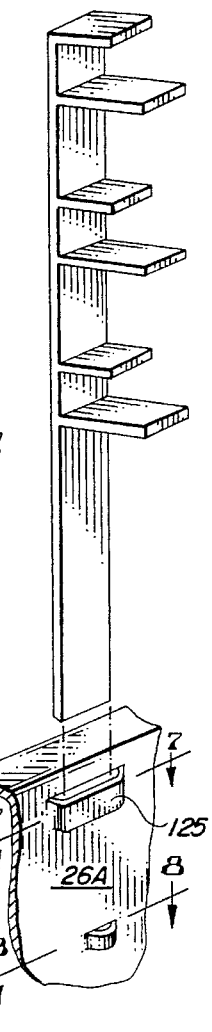
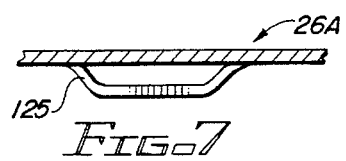
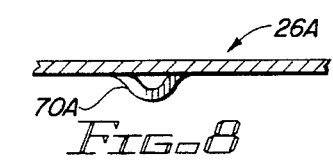
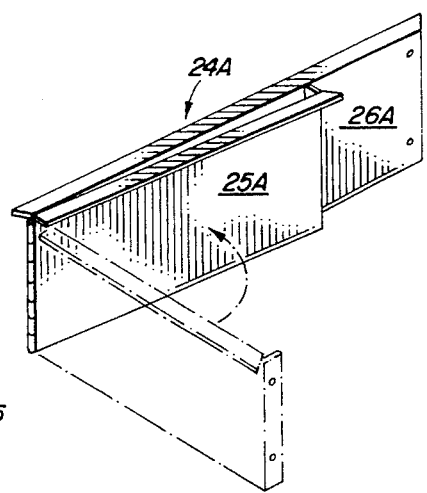
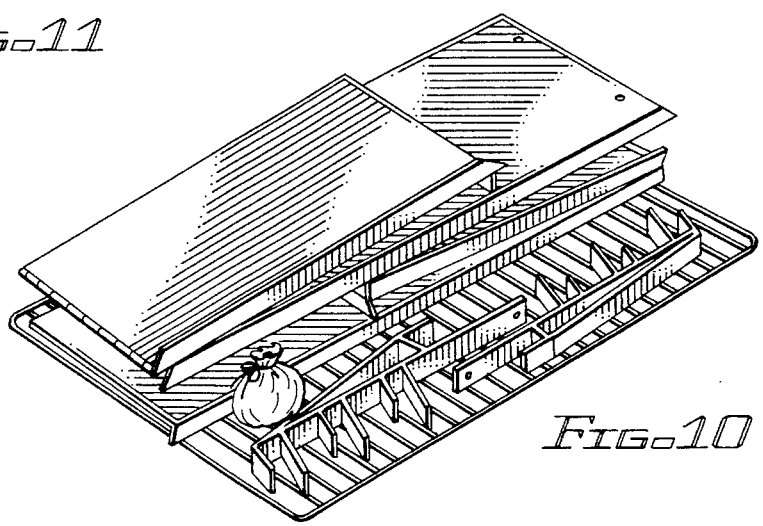

COLLAPSIBLE PORTABLE COOKING UNIT

FIELD OF THE INVENTION

The present invention relates to cooking units for outdoor use and more particularly relates to a cooking grill unit which for convenience of storage, transportation and handling may be folded into a compact unit and quickly assembled at the time of use.

BACKGROUND OF THE INVENTION

Various types of outdoor cooking grills are in common use and may be found in the prior art.

In general, cooking devices, both gas and charcoal, are relatively large and cumbersome and do not lend themselves to portable use by hikers, boaters, picnickers and the like. Transportation of conventional cooking units is generally not practical in that these units are large, awkward to use and most are not designed for portability and, accordingly, are not effective for use in connection with outdoor activities of the type mentioned above.

Accordingly, there exists a need for an outdoor cooking unit which is of adequate size for cooking and warming a number of food items and also is capable of being folded to a compact, portable size convenient for storage, handling and transportation.

Accordingly, it is a primary object of the present invention to provide an outdoor cooking unit that is constructed so that it may be erected for use in a few minutes of time and which can be used with either gas, wood or charcoal fuel.

It is a further object of the present invention to provide a cooking unit which can be disassembled into a limited number of parts.

It is another object of the present invention to provide a highly portable, outdoor cooking unit which allows the user with ease to position the cooking surface at a selected desired height from the heat source.

It is another object of the present invention to provide a portable barbecue grill which may be easily stored, transported and erected by the user and which has provision for the addition of a drip pan to collect fire debris.

As indicated above, various cookers of the portable type can be found in the prior art. The closest and most pertinent devices of this type are the following:

U.S. Pat. No. 4,905,582 shows a portable, foldable roaster in which the front and rear plates and the side plates nay be folded to lie on the bottom to form a flat unit convenient for carrying.

U.S. Pat. No. 4,977,824 shows a roll-up cooking grill which in an open position provides a relatively flat cooking surface and when stored is configured to fit inside of a cylindrical case.

U.S. Pat. No. 4,569,327 shows a collapsible, folding barbecue having side plates and back plates hingedly connected to a base plate. The side wall and rear wall are in overlapping relation when folded.

U.S. Pat. No. 4,457,290 shows a compact, knock-down charcoal cooker which includes an outer pan frame and a fire tray. Assembly pins secure the sides and back against collapse and all detachable elements are storable in the collapsed, knocked-down cooker in a generally rectangular package.

U.S. Pat. No. 4,508,096 shows a cooker in which the fire pan and cover serve as a housing in which the support plates, front and side panels and grill may be stored.

U.S. Pat. No. 4,971,045 shows a collapsible wood-burning stove that can be easily disassembled and assembled. The plates form a box-like structure and are assembled at inter-engaging slots.

U.S. Pat. No. 5,243,961 shows a portable cooker which may be collapsed with the grill and tray supported between the back and the sides of the support.

While the above patents are representative of the prior art and show various portable and collapsible cooking units and grills, there nevertheless exists a need for a convenient and effective collapsible cooking unit which is versatile, may be easily manufactured and is compact and easily stored and easily transported to a location of use.

SUMMARY OF THE INVENTION

In general, the present invention is directed to a compact foldable, knockdown cooker of the type which may be used at picnics, camping and cook-outs and which is easy to assemble, use and which is also easy to clean and store. The cooking unit consists of two wall assemblies each having a pair of panels which are hingedly secured to one another. The wall assemblies are attachable to one another at removable fasteners to form a generally rectangular enclosure. At least two of the opposed panels forming the enclosure have shoulders which will support a grate near the bottom of the enclosure.

A pair of hangers are detachably securable in a vertical position to one of the panels forming the enclosure. The hangers each have pairs of spaced-apart projecting arms which will removably receive and support a cooking grill or surface at a selected elevation above the enclosure. The device may be used with charcoal or wood in which case the charcoal or wood is supported on the grate within the enclosure and ignited. The device may also be used with a fuel such as propane, butane or other liquid fuels provided in a small canister. In this case, a gas burner may be secured within the enclosure and connected to the fuel supply. Gas fluid may be more convenient and can be used in areas where open fires are prohibited.

The enclosure, when erected, may be supported on a pan having upstanding flanges which receive the enclosure. The pan will receive and contain drippings and ash making use of the grill safer and more environmentally acceptable, particularly in camping areas such as beaches where campers are required to leave camping areas free of any litter, including fire remains.

The cooking grill has handles which are pivotally attached so they may be folded against the grill surface for storage or may be extended outwardly to lift and move the grill surface.

The device may be quickly erected and upon completion of use, the cooking surface, grate and grill may be easily removed and the enclosure folded into two compact wall assemblies. Ash and other cooking debris that may have collected on the pan may be conveniently placed in a disposal receptacle.

BRIEF DESCRIPTION OF THE DRAWINGS

The above and other objects and advantages of the present invention will become more apparent from the following description, claims and drawings in which:

FIG. 1 is a perspective view of the portable cooking unit of the present invention;

FIG. 2 is a sectional view taken along line 2—2 of FIG. 1;

FIG. 3 is an exploded view of the cooker of the present invention;

FIG. 4 is a detail view of the connection between wall assemblies;

FIG. 5 is a detail view of the hinge connection between adjacent panels formed in the wall assembly;

FIG. 6 is a detail view of a grill hanger and a portion of the enclosure showing an alternate means of detachably securing the hanger to the enclosure;

FIG. 7 is a sectional view taken along line 7—7 of FIG. 6;

FIG. 8 is a sectional view taken along line 8—8 of FIG. 6;

FIG. 9 is a perspective view of a wall assembly showing the assembly folded in a compact position and also showing the unfolded condition in phantom lines;

FIG. 10 is a perspective view showing the components of the cooking unit in a compact, stored position; and FIG. 11 is a detail view of the cooking grill and attached handles.

DETAILED DESCRIPTION OF THE INVENTION

Referring more particularly to the drawings, the cooking unit according to the present invention is generally illustrated by the numeral 10 and generally includes an enclosure 12 and a pan 14 on which the enclosure may be removably positioned during use. The pan collects and contains cooking and fire debris. The cooking unit 10 also includes a grate 16 removably positioned within the lower part of the enclosure on brackets 70 and 70A. A pair of hangers 18 and 18A are provided to support a cooking surface or grill 20 at the desired elevation. These basic components provide a portable grill which is easily manufactured by conventional manufacturing techniques and provides a unit which is easy to assembly, use and collapse for storage. The components are described in greater detail below.

The enclosure 12 is comprised of a pair of wall assembly units 24, 24A which are essentially identical. The wall assembly unit 24 includes panels 25 and 26 which are each generally rectangular and may be any suitable dimension although for purposes of illustration, panel 26 is shown as having a greater length than panel 26 resulting in overall assembled construction in which the assembled enclosure 12 is rectangular. Panels 25 and 26 each are provided with a flange 28 and 30, respectively, which form the upper edge of the panels and are disposed at general right angles with respect to panels 25, 26. Preferably the opposite ends of the flanges 28 and 30 are mitered so that continuous flange rim extends around the enclosure when the unit is assembled.

Panels 25, 26 are hingedly connected along their adjacent vertical edges 32 and 34. The hinge connection is shown in detail in FIG. 5. It will be seen that vertical edge 34 is provided with a plurality of tubular sockets 38. Vertical edge 32 of panel 26 is similarly provided with a plurality of tubular sockets 40. When the units are assembled as shown in FIG. 1, the respective sockets 38, 40 on the panels inter-engage to form a continuous channel for the receipt of a hinge pin 44. Generally the hinge pin 44 will remain in position as each of the assemblies 24, 24A can be folded into a flattened position when not in use. However, it may be desired for purposes of transportation and cleaning to disassemble panels 25, 26 in which case the hinge pin 44 may be removed.

The vertical edges 50 and 50A of panels 25 and 25A, respectively, are each provided with a flange 52, 52A which form right angles with respect to the panel and are inwardly disposed with respect to the enclosure 12. The flanges 52 each carry one or more threaded studs 58, 58A.

Assembly 24A is constructed identical to wall assembly 24. Thus, wall assemblies 24, 24A may be positioned as shown in FIGS. 3 and 4. The same or identical elements or components of panel 24A have been identified with the appended letter "A". Bores 62 in panel 26 align with the studs 58A extending from flange 52A. Similarly, bores 62A in panel 26A will align with studs 58 on flange 52. When aligned, the wall assemblies can be secured by removable fasteners and wing nuts 65. This construction provides quick and convenient assembly. Further, manufacture of the units are facilitated since wall assemblies 24 and 24A are essentially identical.

The enclosure 12 defines a generally rectangular fire box area 60. Heat emanating from the fire box area may be provided either by a solid fuel such as charcoal briquettes or may be a gas or liquid fuel. If charcoal fuel is to be used, a charcoal supporting grate 16, formed of a grid of stainless steel wire or the like, is supported on brackets 70 and 70A oppositely positioned on the interior surface of panels 25 and 25A. The brackets may be simply tabs welded or otherwise secured to the interior surface of the panels or may be in the form of shoulders pressed from the material from the panels. Preferably the panels 25, 26, 25A and 26A are suitable material such as a mild steel. Thus, the panels can be formed by conventional metal stamping and bending techniques.

If the user desires to use a gaseous fuel, the grate 16 would need not be positioned with the enclosure. Gas fuel may be preferred or even required in some camping environments where open fire restrictions are in effect. To facilitate the use of gas-fuel, a bore 72A is provided in panel 25A which bore receives one end of a gas distribution pipe 71 which is part of a burner assembly 74. The end of the gas pipe 70 carries a quick connect fitting 78 which is detachably securable to the hose leading from the fuel supply 75 such as a container of butane or propane of the type commercially available.

When used, the cooking unit may be placed on a suitable surface such as the ground but it is preferred for convenience that the unit be placed on the pan 14. The pan 14 is shown as being generally rectangular having dimensions slightly greater than the exterior dimensions of the enclosure. A plurality of tabs 82 project from the upper surface of the pan and is dimensioned to snugly receive the exterior of the enclosure so that the enclosure seats within the area defined by the tabs. Handles 85 are provided on the opposite ends of the pan 14 to facilitate lifting the pan and cooking unit and also facilitate lifting the pan when dumping debris or ashes that may have fallen onto the surface of the pan.

Cooking is accomplished on a grill 20 which is formed in a grid-like structure of stainless steel wire or rods which are suitably welded together as is conventional. Pads 21 are welded to the underside of the grill inwardly of the edge to support the grill in the cooking position shown in FIG. 2 supported on hangers 18, 18A.

Hanger 18 is shown in FIG. 2 and is representative of hanger 18A. Each hanger comprises a vertical support 86 which has a depending lip 88 spaced apart from its rear side and connected to support 86 by reinforcing member 92 which extends downwardly from the upper end of support 86. Thus, it will be seen that the hanger is engageable with enclosure panel 26A engaging the flange 30A with a lower section of the support 86 extending along the inner side of panel 26A. The lower end of the support 86 defines an aperture 90 which registers with the corresponding aperture 92 in panel 25. A suitable fastener 94, shown as a bolt and wing nut, detachably secures the hanger in the position shown in FIGS. 1 and 2. The hanger 86 serves to position the cooking grill 100 at various elevations with respect to the enclosure. It will be apparent that the lower the position of the grill, the closer the grill is to the source of heat and therefore the hotter the area at the cooking surface. Thus, the user may select an elevation for the grill consistent with cooking requirements of the items being prepared.

Accordingly, there are shown a plurality of cantilever arms 104 and 106 at spaced locations along the inner face of the hanger. For example, support 104 angles slightly upwardly with respect to support member 86. Arm 106 is spaced above arm 104 a distance, for example approximately one inch, and arm 106 is shorter than arm 104. The grill 20 is represented in phantom lines and can be inserted between the arms resting at pads 21 on the outer end of one arm 104 and retained from tipping by shorter arm 106. Additional arms 104A, 106A, 104B, 106B are positioned at other elevations along the hanger.

The user may grasp the grill using the lifting devices 110 which are formed of generally U-shaped metal wire rod 115 and having a heat-insulative handle 112. The ends of the rod are formed having eyelets 122 which are engaged over the ends of pivot pins 118 welded to the grill. As seen in FIGS. 2 and 11, the handles may be pivoted outwardly to lift and position the grill 20 or folded inwardly over the cooled grill surface for storage. The user can manipulate the grill 20 by inserting the lifter between the grids of the grill and engaging the lifter with these grids and lifting the grill to insert it into the horizontal position between retaining arms at a selected location along the hanger.

An alternative arrangement for removably securing the hangers 18, 18A to the enclosure is shown in FIG. 6. In this embodiment, the panel 26A is shown having a slot 125 for slidably receiving the lower end of the hanger. The slot is mechanically formed by a suitable pressing operation. Similarly, supports 70 and 70A on which the lower grate 16 may rest, may be formed by a mechanical metal stamping or pressing operation.

The cooking unit 10 of the present invention is assembled as has been described above. When the unit is not in use, the enclosure is lifted from the fire pan 14 and wing nuts 65 disengaged from their associated studs. This allows the wall assemblies 24, 24A to be detached and folded in the manner shown in Figure 9. The hangers 18, 18A are also detached from their associated panel. The entire unit can be conveniently stored as shown in FIG. 10. The cooking unit of the present invention is compact and easily transported to a use location where it can be assembled. It may easily be cleaned, particularly when it is disassembled. The cooker of the present invention has the advantage of facilitating use of either solid fuels or gas fuels such as propane or butane. The cooking surface can be positioned at a desired elevation and, in fact, several cooking surfaces can be used at one time. For example, food could be cooked on a grill positioned at the lowermost arms on the hanger while other food items could be maintained at a warmed condition on separate grill positioned at one of the upper-most sets of arms on the hangers.

Having thus described my invention and the preferred embodiments thereof, others skilled in the art will readily perceive improvements, changes and modifications. To the extent these various improvements, changes and modifications do not depart from the spirit and scope of the appended claims, they are intended to be encompassed therein.

I claim:

1. A flexible cooking unit comprising:

(a) a first wall assembly having first and second panels hingedly connected to one another whereby said first wall assembly may be pivoted from a generally flat stored position to an erected position with said panels disposed at right angles with respect to one another;

(b) a second wall assembly having first and second panels hingedly connected to one another whereby said second wall assembly may be pivoted from a generally flat stored position to an erected position with said first and second panels being generally at right angles with respect to one another;

(c) means for detachably securing said first and second wall assemblies in an erected position to form an enclosure;

(d) grate supporting means disposed on at least two of said panels of said wall assemblies at opposite locations;

(e) a grate positionable on said grate supporting means in a generally horizontal position;

(f) hanger means detachably secured to one of said panels in a generally vertical position, said hanger means having an elongate upright or vertical support with at least first and second arms projecting therefrom defining a slot therebetween for removably receiving said grill therein in a generally horizontal position disposed above said enclosure; and (g) a cooking grill.

2. The cooking unit of claim 1 wherein said wall assemblies define a peripheral flange extending around the upper edges of said panel in said erected position.

3. The cooking unit of claim 1 wherein said hanger means are detachably secured by mechanical fasteners.

4. The cooking unit of claim 1 wherein said hanger means are detachably secured to said panels at slots formed in said panels by a metal forming process.

5. The cooking unit of claim 1 wherein said hanger means define a plurality of arms defining a plurality of spaced-apart grill-receiving areas.

6. The cooking unit of claim 1 wherein at least one of said panels defines an aperture and further including a gas burner positionable in said enclosure means, said gas burner having a gas distribution pipe extending through said aperture, said gas distribution being connectable to a source of gaseous fuel.

7. The cooking unit of claim 1 further including a generally planar pan having projections thereon for nestably receiving said enclosure in an erected position.

8. The cooking unit of claim 7 wherein said pan is provided with handles.

9. The cooking unit of claim 1 further including lifting means engageable with said grill to manipulate and position said grill in said slots.

10. The cooking unit of claim 1 wherein said lifting means is pivotally secured to said grill and moveable to a stored position overlying a surface of the grill to an extended use-position.

* * * * *